United States Patent [19]

Moog

[11] Patent Number: 4,776,610

[45] Date of Patent: Oct. 11, 1988

[54] SHORT-STROKE POSITION TRANSDUCER FOR A VEHICLE SUSPENSION SYSTEM

[75] Inventor: William C. Moog, East Aurora, N.Y.

[73] Assignee: Moog Inc., East Aurora, N.Y.

[21] Appl. No.: 936,223

[22] Filed: Dec. 1, 1986

[51] Int. Cl.$^4$ .............................................. B60G 11/26
[52] U.S. Cl. .................................... 280/707; 280/611;
280/DIG. 1
[58] Field of Search ......... 280/689, 703, 707, DIG. 1, 280/6.1; 188/1-11; 267/166

[56] References Cited

U.S. PATENT DOCUMENTS

| | | | |
|---|---|---|---|
| 3,124,368 | 3/1964 | Corley et al. | 280/707 |
| 3,199,928 | 8/1965 | Chouings | 280/DIG. 1 |
| 4,076,275 | 2/1978 | Hiruma | 280/707 |
| 4,105,216 | 8/1978 | Graham et al. | 280/707 |
| 4,625,993 | 12/1986 | Williams et al. | 280/707 |

FOREIGN PATENT DOCUMENTS 237321  1/1964  Netherlands ..................... 280/6.1

OTHER PUBLICATIONS

*Automotive Engineer*, Feb./Mar. 1984, pp. 56-57, "Lotus' Active Suspension".
*Popular Science*, Jul. 1986, "No-Springs, No-Shocks Suspension", McCosh, pp. 60-63.
*Popular Science*, Sep. 1986, p. 12, "Springless Corvettes", McCosh.

Primary Examiner—Kenneth R. Rice
Attorney, Agent, or Firm—Sommer & Sommer

[57] ABSTRACT

A vehicle suspension system (10) has a spring (11) operatively arranged to act between sprung (15) and unsprung (13) masses. The coil (24) of an LVDT (22) is mounted on the sprung mass. The core (23) of the LVDT is connected to an intermediate portion (25) of the spring. Thus, displacement of the core relative to the coil will be a proportional fraction of the relative displacement between the masses. This arrangement allows the use of a short-stroke position-sensing transducer to measure the relative displacement between the two masses.

6 Claims, 1 Drawing Sheet

U.S. Patent   Oct. 11, 1988   4,776,610
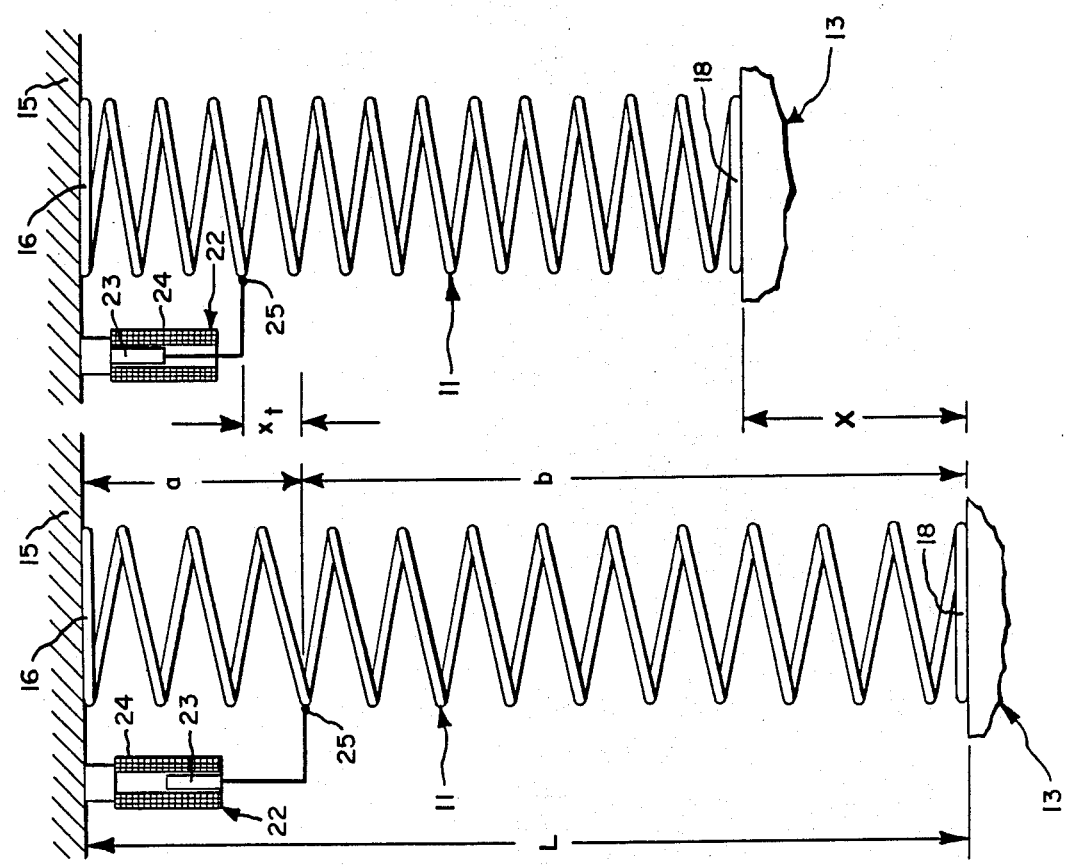
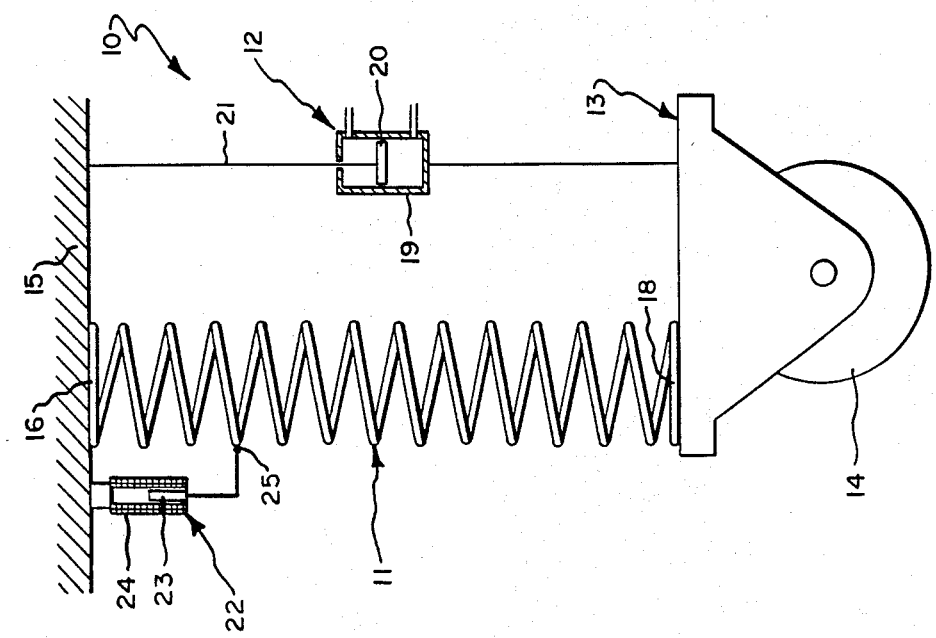

SHORT-STROKE POSITION TRANSDUCER FOR A VEHICLE SUSPENSION SYSTEM

TECHNICAL FIELD

The present invention relates generally to the field of vehicle suspension systems, and, more particularly, to an improved arrangement which allows the use of a short-stroke transducer to sense the relative positions between the sprung and unsprung masses of a vehicle.

BACKGROUND ART

In a conventional suspension system, a road wheel is mounted for movement upwardly and downwardly relative to the body. A coil spring and a shock absorber are typically arranged between the body and the supporting structure on which the wheel is mounted. The shock absorber controls the flow of fluid between two chambers, and functions to dampen the velocity of relative movement between the body and the road wheel.

In recent years, there has been considerable interest in developing an "active" vehicle suspension system. See, e.g.: "Lotus' active suspension", Automotive Engineer (Febrary/March 1984) [pp. 56–57]; McCosh, "no-springs, no-shocks suspension", Popular Science (July 1986) [pp. 60–63]; and McCosh, "Springless Corvettes", Popular Science (Sept. 1986) [p.12]. In these "active" systems, the conventional spring and shock absorber are replaced by a servocontrolled double-acting hydraulic actuator. Suitable sensors, such as accelerometers and the like, are used to sense and determine certain parameters, such as body attitude and acceleration. The signals generated by these sensors are appropriately tailored and used as command signals to servovalves, which control the flow of fluid to the actuators. Thus, rather than merely responding passively and reactively to various forces acting on the vehicle, the "active" systems may be used to affirmatively correct and compensate for the effects of such forces. For example, during braking, the conventional vehicle will "nose down". However, with an actively-controlled system, the various servos may be operated, either independently or in combination with one another, to maintain the body level and horizontal during braking, acceleration and cornering.

In some hybrid or semi-"active" systems, the conventional spring remains, but the shock absorber is replaced by a servocontrolled actuator. Such spring and actuator may be arranged either in parallel or in series with one another.

In any event, in such "active" and "semi-active" systems, and in still other level- and attitude-control systems (e.g., those employing variable-rate shock absorbers having fluid damping characteristics which vary with position), it is often desired to known the relative positions between the wheel and body. Such data may, for example, be used as a feedback signal in a closed-loop servocontrol system. There are many devices available for sensing position and converting it into an analog electrical signal. One such device is a linear variable differential transformer (LVDT), which has a core movable relative to a sensing coil. Such devices could, of course, be connected directrly to the body and the wheel. However, the typical stroke of relative movement between the wheel and the body is relatively long, and this would require the use of a correspondingly long-stroke LVDT.

DISCLOSURE OF THE INVENTION

The present invention provides a unique improvement for use in a vehicle suspension system. The vehicle may be, but is not limited to, an automobile, truck, track-laying vehicle, or the like. A spring is operatively arranged between the sprung and unsprung masses. The spring may have a constant spring rate along its entire length, or different sections thereof may have different rates, as when two different springs are mechanically connected in series with one another. In any event, the spring may either be a working component of the suspension or leveling system, or may be provided solely for the purposes of the sensing position. The improvement broadly provides a transducer, such as an LVDT, for sensing the position of two relatively-movable transducer parts, and for converting such sensed position into an equivalent electrical signal. One part of this transducer is mounted for movement with either the sprung or unsprung masses, and the other part is mounted for movement with an intermediate portion of the spring. The ratio of the distance between the mass to which the transducer one part is connected and the point of the spring to which the transducer other part is connected, to the length of the spring, determines a degree of motion reduction. Thus, relative movement between the ends of the spring will produce a smaller but proportional displacement of the two relatively-movable transducer parts. The improvement allows the use of relatively short-stroke sensing devices to measure the relative positions of the two masses.

Accordingly, the general object of the invention is to provide an improved device for sensing the position of two relatively-movable masses in a vehicle suspension system.

Another object is to provide an improvement for use in a vehicle suspension system, which allows the use of short-stroke sensing transducers to sense and determined the relative positions between two masses.

Another object is to provide an improvement for use with a system for controlling the level or attitude of a vehicle body relative to a road wheel.

These and other objects and advantages will become apparent from the foregoing and ongoing specification, the drawings, and the appended claims.

BRIEF DESCRIPTION OF THE DRAWINGS

FIG. 1 is a schematic view of an improved vehicle suspension system, showing a spring and shock absorber arranged to act between the body and a wheel of a vehicle, and also showing a transducer as being operatively arranged between the body and an intermediate portion of the spring.

FIG. 2 is an enlarged detail view of the transducer and spring shown in FIG. 1.

FIG. 3 is a view similar to FIG. 2, but illustrating the proportionately-smaller displacement of the relatively-movable transducer parts in response to an upward displacement of the road wheel relative to the body.

MODES(S) FOR CARRYING OUT THE INVENTION

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, etc.) together with the specification, and are to be considered a portion of the entire "written description" of this invention, as required by 35 U.S.C. §112. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader.

This invention provides an improvement for use in a vehicle suspension system, of which a fragmentary schematic portion is generally indicated at 10 in FIG. 1. This suspension system is shown as including, in pertinent part, a coil spring 11 and a servocontrolled double-acting hydraulic actuator 12 operatively interposed between a support 13 on which wheel 14 is mounted and the body 15 of a vehicle. The spring and actuator are shown as being arranged in parallel, but this configuration need not invariably obtain. Persons skilled in this art will readily appreciate that the wheel-supporting device 13 is suitably mounted, via control arms and the like (not shown), for upward and downward movement relative to the body. The specific structure by which such device is mounted on the body, has been omitted in the interest of clarity. Thus, spring 11 is shown as having its upper end portion 16 arranged to act against a portion of the body, and as having its lower end portion 18 arranged to act against the wheel-supporting device 13.

Actuator 12 is shown as being a conventional double-acting hydraulic actuator arranged to act between the body and the support. The specific details of the servo-control (e.g., the servovalve, the fluid source, and the like) have been omitted in the interest of clarity. Actuator 12 is simply shown as having a cylinder 19 mounted on the wheel-supporting device, and having a piston 20 slidably mounted within this cylinder. The piston is connected to the body via a rod 21. Thus, fluid may be selectively permitted to flow to and from the opposed actuator chambers to vary the relative positions of the wheel and body.

The present invention provides a unique improvement for use in such a vehicle suspension system, and allows the use of a short-stroke transducer to sense the relative position of the two relative-movable long-stroke masses.

Referring now to FIGS. 2 and 3, the improvement includes a transducer 22, such as an LVDT or the like, for converting position into an analog electrical signal. The transducer has a core 23 mounted for movement relative to a sensing coil 24. Coil 24 is mounted to the body 15 of the vehicle for movement therewith. However, the core 23 is not connected directly to the road wheel assembly. Rather, the core is connected to an intermediate portion, indicated at 25, of spring 11. Thus, if the spring has a vertical length "L", the portion of the spring between the body and the point (i.e., 25) at which the core is connected, is represented by the vertical distance "a", and the balance of the spring between this point and the wheel support is represented by vertical distance "b". Thus, $$L = a + b$$

The significance of this arrangement is that the vertical displacement of the core relative to the coil will be a fraction of the displacement of the road wheel relative to the body. In other words, if the road wheel assembly 13 moves upwardly by a distance "X", as by hitting a bump, the transducer core will move upwardly relative to the coil, by a proportionally-smaller distance "$x_t$," according to the formula:

$$x_t = aX/L$$

This, of course, assumes the absence of friction, and that such compressive displacement of the spring occurs uniformly over its entire length. The foregoing equation may be readily solved for "a":

$$a = x_t L / X$$

Thus, for example, if the spring has a nominal length of, say, 10 units when X = 0, if the displacement of the road wheel relative to the body is, say, x = ±6 units, and if it is desired to use a short-stroke LVDT having a measuring range of, say, $x_t = \pm 1.75$ units, then:

$$a = (1.75)(10)/(6) = 2.92 \text{ units}$$

Thus, the invention provides a unique improvement for use with a vehicle suspension system, and particularly with an "active" system, which allows the use of a short-stroke transducer to measure the displacement of one mass, such as a control arm or the like, relative to another mass, such as the body of a vehicle.

Modifications

The present invention contemplates that many changes and modifications may be made. As previously noted, the spring itself may be a working component of the suspension system, or a passive "measuring-only" element. The spring may be a coil spring, a leaf spring, a torsional spring or bar, a flexure member, or some other type. Such spring may be connected between the body and the device on which the wheel is mounted, or between other relatively-movable parts. The spring may have a uniform spring rate along its entire length, or may have a variable spring rate, as, for example, if two different springs were mechanically connected in series. The transducer may be an LVDT, or some other type of position-sensing device. While one part of such device must be connected to an intermediate portion of the spring, the other part thereof may be connected to either the sprung or the unsprung mass. As used in the appended claims, the term "vehicle" includes, but is not limited to, an automobile, a truck, a track-laying vehicle, and the like. It will be readily apparent that the improvement may be provided between the body and each separate wheel-supporting device, as desired. Moreover, the improvement may be incorporated in other body-leveling or attitude-control systems.

Therefore, while the presently-preferred embodiment of the improvement has been shown and described, and several modifications thereof discussed, persons skilled in this art will readily appreciate that various additional changes and modifications may be made without departing from the spirit of the invention, as defined and differentiated by the following claims.

I claim:

1. In a vehicle suspension system having a first mass and a second mass, and wherein a spring is operatively arranged between said masses, the improvement which comprises:

a transducer operatively arranged to continuously sense the relative position of said masses and to continuously produce an electrical signal substantially proportional to such sensed relative position, said transducer having two relatively-movable parts, one of said parts being mounted for movement with one of said masses and the other of said parts being mounted for movement with an intermediate portion of said spring;

whereby, in the event of relative movement between said masses, the change in the electrical output of said transducer will be substantially proportional to the change in the relative displacement between said masses.

2. The improvement as set forth in claim 1 wherein said first mass is the body of the vehicle.

3. The improvement as set forth in claim 1 wherein said second mass is a road wheel of the vehicle.

4. The improvement as set forth in claim 1 wherein said transducer is a linear variable differential transformer, and wherein said one part is a core and said other part is a coil.

5. The improvement as set forth in claim 1 wherein said first mass is sprung and said second mass is unsprung.

6. The improvement as set forth in claim 1 wherein said spring is a coil spring.

* * * * *